United States Patent [19]

Yuhas

[11] Patent Number: 5,549,178

[45] Date of Patent: Aug. 27, 1996

[54] OIL ABSORBENT PAD

[76] Inventor: Gary R. Yuhas, 9325 London Rd., Orient, Ohio 43146

[21] Appl. No.: 275,372

[22] Filed: Jul. 15, 1994

[51] Int. Cl.$^6$ .................................................. F16N 31/02
[52] U.S. Cl. ........................... 184/106; 141/86; 141/98; 180/69.1; 220/573; 222/108; 296/38; 428/80; 428/81; 428/182
[58] Field of Search .................... 184/106; 222/108; 141/86, 88, 98, 311 A; 15/215–217; 220/571, 573; 137/312; 180/69.1; 428/80, 81, 116, 120, 179, 182; 296/38

[56] References Cited

U.S. PATENT DOCUMENTS

| 2,826,778 | 3/1958 | Highlen | 15/215 |
| 3,141,522 | 7/1964 | Fitzpatrick | 180/69.1 |
| 3,228,491 | 1/1966 | Gatsos | 184/106 |
| 4,798,754 | 1/1989 | Tomek | 184/106 |

FOREIGN PATENT DOCUMENTS 0078528  3/1992  Japan ................. 428/116

Primary Examiner—Edward K. Look
Assistant Examiner—Christopher Verdier
Attorney, Agent, or Firm—John B. Dickman, III

[57] ABSTRACT

An oil collecting mat for collecting oil drippings from a motor vehicle. The mat has a bottom with upstanding side walls coated with an oil and water proofing agent, and a plurality of sheets of corrugated cardboard stacked on end to absorb oil. In one embodiment the sheets of corrugated cardboard are rolled into cylinders and glued to the bottom portion. In another embodiment the sheets of corrugated cardboard alternate with sheets of foam sponge, which includes plastic foam or rubber foam.

2 Claims, 2 Drawing Sheets

OIL ABSORBENT PAD

BACKGROUND OF THE INVENTION

Heretofore, there have been various attempts to collect grease and oil drippings from motor vehicles. These prior art attempts have taken the form of a catch pan or a mat placed beneath a vehicle oil pan. When the pan or mat has collected as much oil as it can reasonably hold it is emptied, as in the case of a catch pan, or thrown away, if it is an absorbent mat. This solution is fine for a private home where either the pan or mat can be monitored daily or weekly without any problems. However, with the growing concerns for the environment and rain water run off, such limited capabilities to monitor oil drippings and collection in public and private parking garages are being noticed by the Environmental Protection Agency. There appears to be a possible new set of regulations on the horizon to guard against oil drippings in parking lots and garages where the oil can be washed into sewers and eventually rivers, bays and oceans. One form of the regulation could require adequate collection means to hold a week's or month's collections. It is forecast that the fines for not complying will be prohibitive. There will be many new proposals on how to meet and deal with the present problems and possible regulations. The starting point for any proposal is the prior U.S. patents, therefore to show the current status of the mat type collectors, U.S. Pat. Nos. 1,356,598 and 3,228,491 are of interest. U.S. Pat. No. 3,228,491 discloses a corrugated cardboard mat coated on one side with a moisture-proof coating for collecting grease and oil. U.S. Pat. No. 1,356,598 is directed to a garage of corrugated cardboard and coated with a water proofing agent, where the mat is used while working beneath an automobile. Another drip catcher is disclosed in U.S. Pat. No. 1,349,314 where a shallow basin-like receiver of plaster of Paris or some other suitable porous material collects water dripping from a refrigerator. One other patent of general interest is U.S. Pat. No. 1,251,964 which discloses a corrugated cardboard cushion pad.

The singular problem with the described patents is they are not structured to collect and hold a volume of oil. The absorbent nature of corrugated cardboard is well known, however, when laid flat the top sheet is less absorbent than the corrugated end, which has open corrugated pockets. In addition, the single corrugated sheet in U.S. Pat. No. 3,228.491 is limited in use to private homes, or a single automobile use.

It is the purpose of the invention to provide an oil drippings collecting mat for commercial use. The mat is structured to hold a week or more collection of oil drippings without overflowing; while being inexpensive and constructed of recycled corrugated cardboard.

SUMMARY OF THE INVENTION

The present invention is directed to an oil collecting mat, and, more particularly to an oil collecting device having a capacity to hold large volumes of oil in commercial environments.

In the preferred form of the invention a plurality of sheets of corrugated cardboard are vertically oriented and glued to the flat face of a corrugated cardboard sheet and the exposed peripheral edges are sealed with a water and oil proofing agent. The flat sheet is also sealed. The assembled mat is ready to be placed beneath a motor vehicle in a garage or elsewhere as desired. Depending on the application of the mat, the plurality of sheets of corrugated cardboard have a height of between ½ to 2 inches, with 2 inches being the most popular size for parking garages, and ½ inch for auto repair facilities.

In the second embodiment of the invention, sheets or strips of corrugated cardboard are tightly rolled into cylinders having about a 6 inch diameter. The rolls are glued on edge to a flat corrugated cardboard sheet and the peripheral edges of the flat sheet are folded up and glued to the rolls to from a tray. The outside of the tray is sealed with an oil and water-proofing agent.

The third embodiment is made of alternating layers of corrugated sheets standing on end and a sponge material. Again a tray is formed with upstanding walls coated with an agent to prevent oil and water leaks.

DESCRIPTION OF THE PREFERRED EMBODIMENTS

Figure 1:
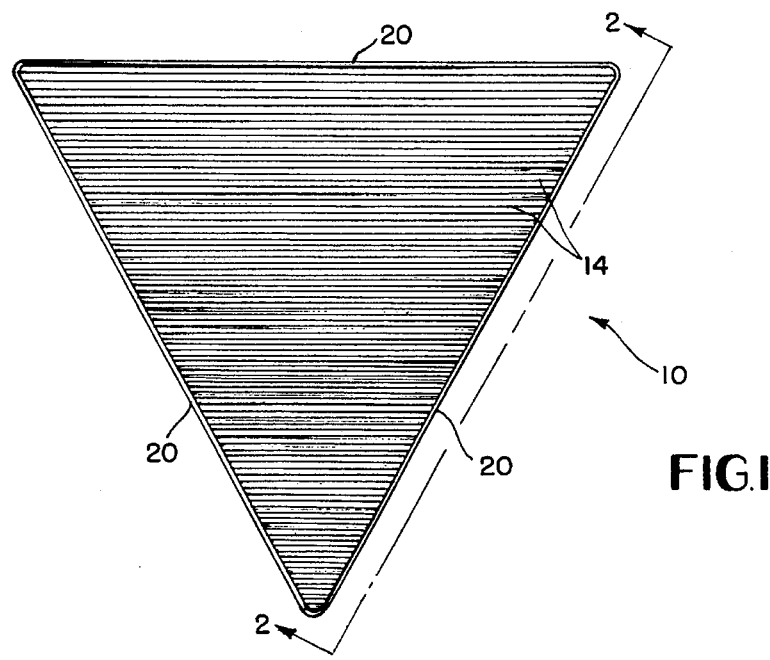
FIG. 1 is a top plan view of an oil collecting mat of the invention.

Referring to the drawings, FIGS. 1–4, there is shown an oil drip collecting mat 10. The mat 10, FIG. 1, has a bottom 12 and a plurality of perpendicularly stacked sheets of corrugated cardboard 14. The sheets of corrugated cardboard 14 are glued to the bottom 12 so that the sheets 14 stand on edge and the corrugations are visible. Each corrugated cardboard sheet 14 has a pair of outside flat sheets 16 and a corrugated sheet 18 sandwiched between, as shown in FIG. 1a.

Figure 2:
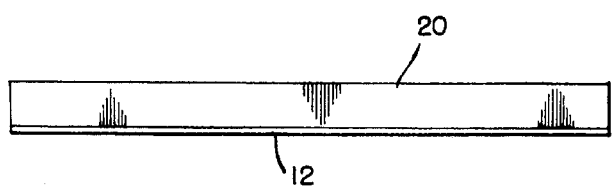
FIG. 2 is a side view of the oil collecting mat taken along the line 2—2 of FIG. 1.

The corrugated cardboard sheets 14 are centered on the bottom sheet 12 to provide upstanding side walls 20. FIG. 2 shows a side view of a mat 10 and one of the side walls 20. The outside of the side walls 20 and the bottom are coated with an oil and water proofing agent, for example, plastic or silicone.

Figure 1A:
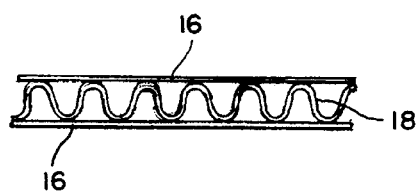
FIG. 1a is a cross-section view of a cardboard sheet of the invention.
Figure 3:
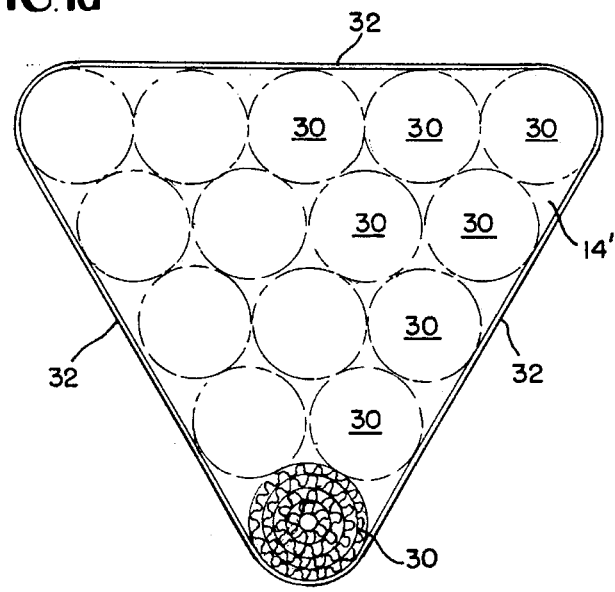
FIG. 3 is a top view of another embodiment of the invention.

The shape of the mat 10 shown in FIG. 1 is a triangular. The size of the mat is such that it will cover an area under a vehicle about the size of an oil pan. The height of the corrugated cardboard sheets 14 is between ½ to 2 inches depending on use. The smaller ½ inch height would be used in auto repair garages where if it is used once and disposed of, the cost would be reasonable. The larger 2 inch height has broader applications like commercial parking garages.

The second embodiment also has a bottom 14' that is similar to the preferred embodiment. A plurality of rolled sheets of corrugated cardboard 30 are glued to the bottom 14'. Each roll of corrugated cardboard 30 is rolled to expose the corrugated cross-section of the sheet as shown in FIG. 1a. The height of each roll is between ½–2 inches and the peripheral edges of the bottom 14' are folded to form upstanding walls 32. The outside of the walls 32 and bottom 14' are coated against oil and water.

Figure 4:
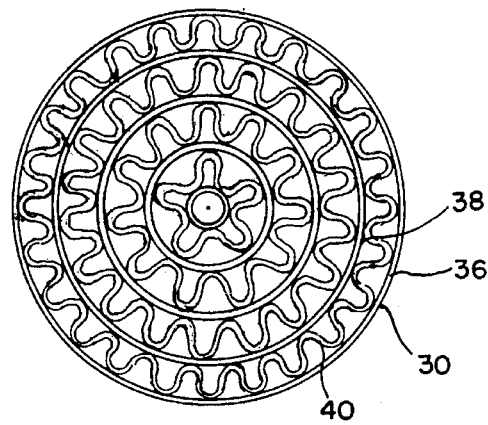
FIG. 4 is a top plan view of an oil collecting element of FIG. 3.

FIG. 4 is a top view of a rolled sheet of corrugated cardboard 30. Each sheet has an inside and outside sheet 36 and 38 with a corrugated sheet 40 sandwiched in between.

Figure 5:
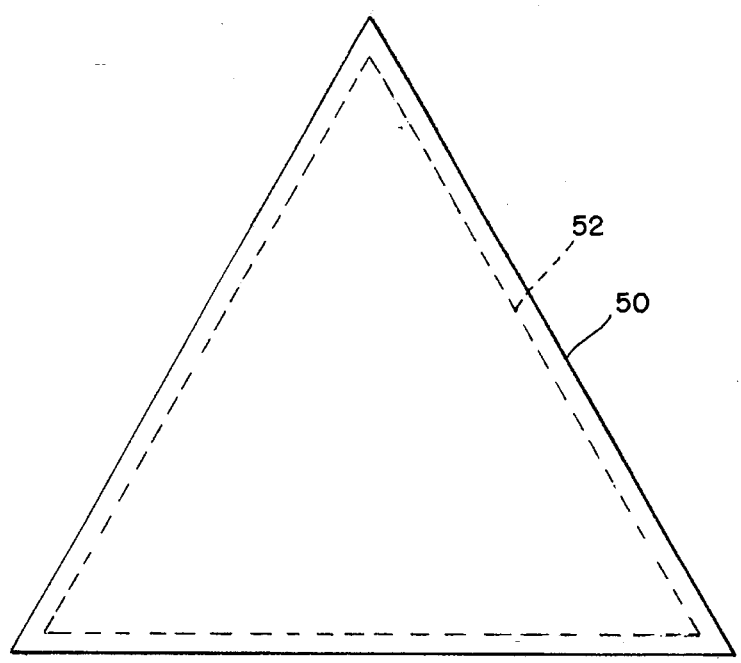
FIG. 5 is a top view of another embodiment of the invention.
Figure 6:
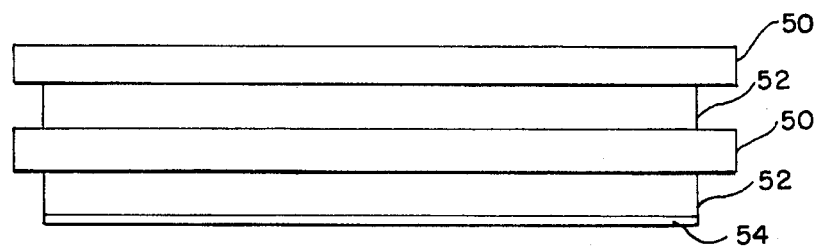
FIG. 6 is a side view of FIG. 5.

In FIG. 5 and FIG. 6 the mat has alternate layers of corrugated sheets 50 and foam rubber or plastic sponge 52. The corrugated sheets 50 are stacked on end like sheets 14 in FIG. 1 on top of a foam rubber sponge 52. There is a bottom sheet 54, FIG. 6, with a foam rubber sponge 52 glued to it. The bottom sheet 54 has peripheral edges that are folded upwardly to form side walls.

While three embodiments of the invention have been disclosed, it is understood that other embodiments may be realized. Therefore, one should study the drawings, disclosure and claims for a full understanding of the invention.

What is claimed:

1. An oil collecting mat for receiving oil drippings from a motor vehicle comprising:

a bottom member having peripheral upstanding walls;

a plurality of oil absorbent sheets being glued to said bottom member and having said peripheral upstanding walls glued to said plurality of oil absorbent sheets;

said plurality of oil absorbent sheets are sheets of corrugated cardboard where each sheet has a first flat sheet and a second flat sheet with a corrugated sheet sandwiched in between; and wherein said plurality of absorbent sheets include alternating layers of sheets of corrugated cardboard having the cross-sections of corrugations exposed for greater absorption and layers of a foam sponge material.

2. An oil collecting mat as in claim 1, wherein said foam sponge is selected from a group consisting of plastic foam and rubber foam.

* * * * *